United States Patent
Klamm

[19]

[11] Patent Number: 5,836,679

[45] Date of Patent: Nov. 17, 1998

[54] PORTABLE WORK LIGHT WITH ADAPTABLE SUPPORTING MECHANISM

[76] Inventor: Thomas L. Klamm, 253 N. Wisconsin St., Racine, Wis. 53402

[21] Appl. No.: 828,210

[22] Filed: Mar. 21, 1997

[51] Int. Cl.[6] .................................................. F21V 21/16
[52] U.S. Cl. ...................... 362/391; 362/220; 362/396; 362/407
[58] Field of Search ............... 24/115 H, 129 R, 24/136 K, 136 R; 362/80, 220, 223, 391, 407, 396

[56] References Cited

U.S. PATENT DOCUMENTS

| | | | |
|---|---|---|---|
| 627,215 | 6/1899 | Stewart | 362/407 |
| 933,664 | 9/1909 | Powell | 362/407 |
| 2,577,466 | 12/1951 | Jones | 24/115 H |
| 2,632,219 | 3/1953 | Massey | 24/115 H |
| 4,364,538 | 12/1982 | Tomlinson | 24/115 H |
| 4,444,145 | 4/1984 | Antkowiak | 362/391 |
| 5,157,591 | 10/1992 | Chudzik | 362/80 |
| 5,158,360 | 10/1992 | Banke | 362/391 |
| 5,521,806 | 5/1996 | Hutzel et al. | 362/80 |

*Primary Examiner*—Alan Cariaso
*Attorney, Agent, or Firm*—Quarles & Brady

[57] ABSTRACT

A portable work light has a transparent tube through which light is emitted from a source within the tube. A pair of fasteners each have a strap that extends around the tube with a coupling attached to the strap. A cord passes through both couplings and has fixed loop at one end through which passes a section of the cord at the other end. The fixed loop is received within a tubular fastener which is able to slide along the fixed loop. The tubular fastener has a first position along the fixed loop in which the section of the cord is captivated from moving through the fixed loop, and a second position in which the section of cord is able to move through the fixed loop. This structure allows the cord to be held cinched around an object for supporting the transparent tube from which light is emitted.

10 Claims, 2 Drawing Sheets

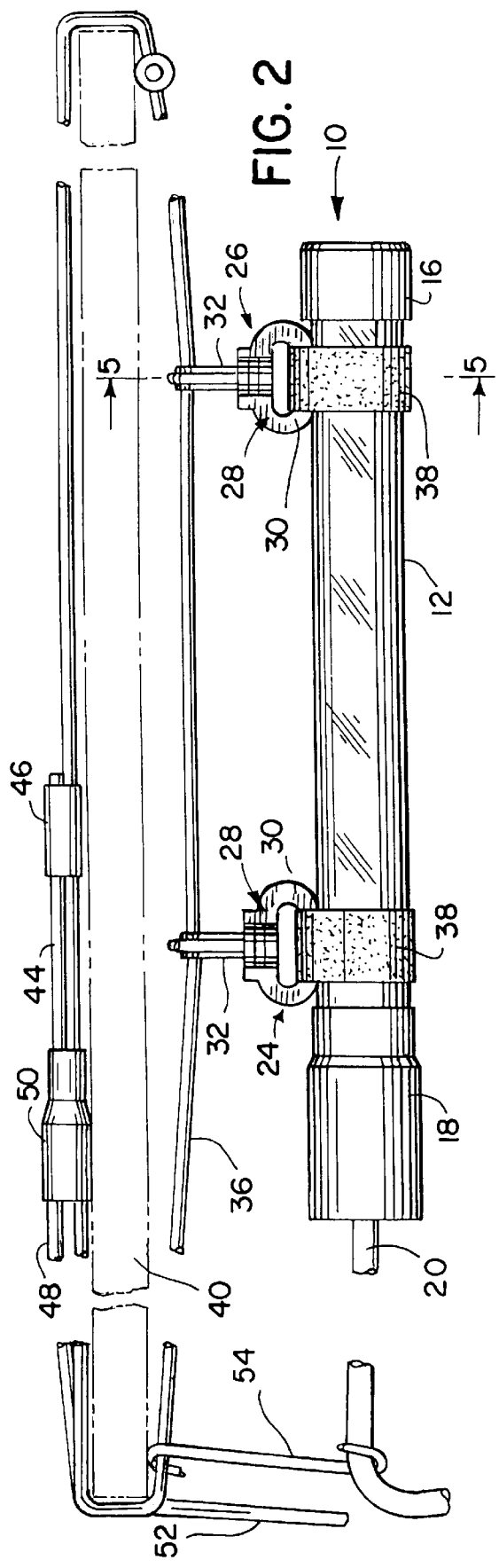

PORTABLE WORK LIGHT WITH ADAPTABLE SUPPORTING MECHANISM

BACKGROUND OF THE INVENTION

The present invention relates to portable lights for illuminating work areas; and more particularly to such work lights with mechanisms for attaching to the object being worked upon.

Mechanics and technicians frequently require illumination of remote or recessed work spaces, such as automobile engines and undercarriages, that are illuminated insufficiently by room lighting. In order to see in these spaces, mechanics utilize flashlights or electrically corded trouble lights which can be placed adjacent the area being worked upon. One problem encountered is the inability to place the work light in a position from which the work area will be illuminated properly. For example, the raised hood of an automobile blocks much of the light from ceiling fixtures in a garage and conventional work lights often can not be hung on the hood in an orientation at which the illumination is properly directed. Similar difficulty is encounter when working underneath an automobile. When a conventional work light is hung by its integral hook, the illumination typically is directed sideways not upward toward the undercarriage work area.

Another problem occurs with work lights that are powered through an electric cord. The dangling cord from a hung work light often interferes with the mechanic's access to the work area.

SUMMARY OF THE INVENTION

A general object of the present invention is to provide a portable light which can illuminate work spaces.

Another object is to provide a mechanism for attaching the work light to the object being worked upon.

A further object of the present invention is to provide a work light which can be adapted for attachment to a variety of different work pieces.

These and other objectives are satisfied by a portable work light which has a transparent tube from which light is emitted. First and second fastening assemblies each have a strap that extends around the transparent tube with a coupling attached to the strap. In the preferred embodiment, the coupling includes hook portion and a loop portion connected together by a swivel mechanism, with the strap extending through the loop portion. A cord passes through the coupling of each fastening assembly, and the cord has a first end portion with a loop through which a portion of the cord passes.

The loop is received within a tubular fastener which is able to slide along the loop. The tubular fastener has a first position along the cord at which the loop is squeezed around the portion of the cord thereby captivating the cord from moving through the loop. At a second position of the fastener, the cord is able to move through the loop. This structure enables the cord to be held cinched around an object for supporting the transparent light emitting tube.

BRIEF DESCRIPTION OF THE DRAWINGS

FIG. 2 is a plane view of the work light in FIG. 1;

FIG. 3 is a detailed view of a locking tube which for fixing the size of the cord loop;

FIG. 4 is a detailed view of the locking tube in a position which permits adjustment of the cord loop;

FIG. 5 is a cross section along line 5—5 in FIG. 2; and

DETAILED DESCRIPTION OF THE INVENTION

Figure 1:
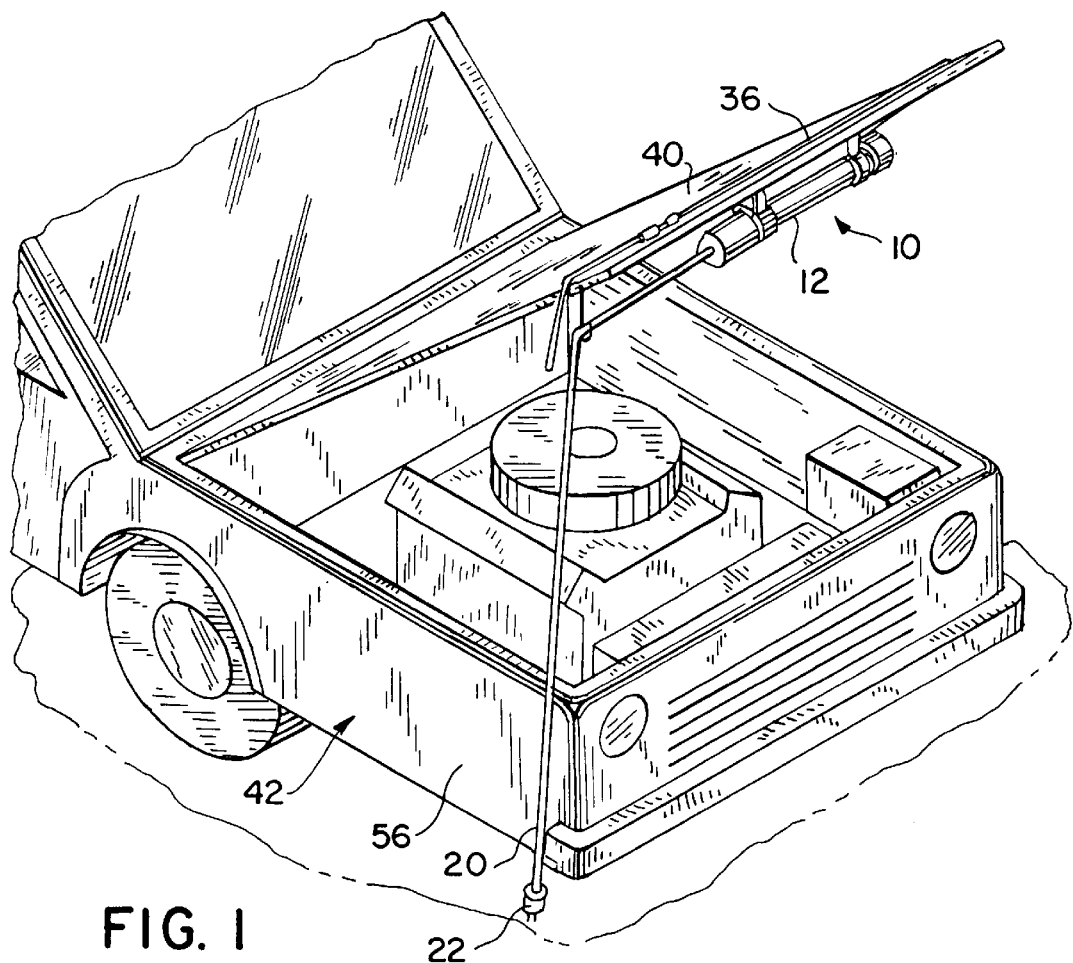
FIG. 1 is an isometric view of a work light according the present invention attached to a raised hood of an automobile by a looped cord.

With initial reference to FIGS. 1 and 2, a work light 10 according to the present invention has a tubular, transparent housing 12 which contains a light bulb 14 (FIG. 5). One end of the tubular housing 12 is closed by one end cap 16. The other end of the tubular housing 12 extends into another end cap 18 which contains standard electrical components for applying electricity to the light bulb 14. A standard two conductor electric supply cable 20 extends from end cap 18 and terminates with a plug 22 for insertion into an electric outlet in order to power the work light 10.

Two coupling assemblies 24 and 26 are attached around the tubular housing 12. As shown in further detail in FIG. 5, each connector assembly has a swivel fastener 28 with a closed loop portion 30 connected to a hook 32 by a swivel mechanism 33. A strap 38 extends through the closed loop portion 30 and around the tubular housing 12. The strap 38 has overlapping ends which are secured together by a suitable technique such as adhesive or hook-and-loop fastening elements to enable removal of the strap 38. The hook 32 has an opening across which a clasp 34 movably extends to captivate an object, such as cord 36, around which the hook extends. The clasp 34 can be moved so as to allow the captivated cord 36 to pass through the hook opening, thereby removing the hook 32 from the cord.

Referring again to FIGS. 1 and 2, the two coupling assemblies 24 and 26 are hung on a cord 36 which has an adjustable loop extending around the hood 40 of an automobile 42. Preferably, the core 36 is a nylon rope, but other materials commonly used for rope may be employed. In addition elastic material and even plastic coated braided wire having suitable flexibility may be used. Therefore, as used in the description of the present invention and in the claims, the term "cord" includes rope, wire, non-elastic cord and elastic cord and similar materials.

As shown in detail in FIG. 3, one end of the cord 38 is folded back onto itself and secured by a fastener 46 to form a fixed loop 44. For example, the fastener 46 may be a section of heat shrink tubing that has been shrunk to secure the two sections of the cord, or a metal tube or band may be crimped around the two sections of the cord 36. The opposite end 48 of the cord 36 passes through the end loop 44.

A resilient fastening tube 50 extends around the end loop 44 and is slidable along the cord 36. As shown in FIG. 4, the resilient fastening tube 50 may be slid along the end loop 44 toward the fixed fastener 46 exposing the curved portion of the end loop 44. In this orientation, the curved portion of the end loop 44 opens allowing the opposite end portion 48 of the cord 36 to freely pass through the end loop. This enables the larger loop of the cord which encircles the hood 50 to be adjusted and cinched tightly around the hood to secure the work light 10. The cinching is accomplished by the worker pulling the free end 52 of the cord away from the end loop 44. Once the cord 36 has been tightened around the hood 40, the tubular fastener 50 is slid over the curved portion of the end loop 44 into a position illustrated in FIG. 3 in which the tubular fastener extends over both the end loop 44 and the opposite end section 48 of the cord. The relatively small inner circumference of the tubular fastener 30 squeezes the curved portion of the end loop 44 tightly around the opposite end portion 48 of the cord 36. In addition the tubular fastener 30 also extends over the portion of the cord that passes through the end loop 44, presses that portion into a tight U-shaped bend. Both of these engagements of the tubular fastener 30 with the cord, prevent the portion 48 of the cord from moving through the end loop 44. Thus, the cord 36 is held rightly cinched around the hood 40 of the automobile.

The work light 10 can be removed from the hood 40 by once again sliding the tubular fastener 50 away from the curved portion of the end loop 44, as shown in FIG. 4. This action opens the end loop 44 so that the opposite end portion 48 of the cord 36 can pass freely therethrough.

Because the tubular housing 12 is transparent, the light from the internal light bulb 14 emanates in all directions around the tube illuminating the engine compartment of the automobile 42 when supported on the automobile hood 40.

As seen in FIGS. 1 and 2, an S-hook 54 has one end looped around the cord 36 near an edge of the automobile hood 40 and the opposite end hooked around the electric supply cable 20 to hold that cable adjacent to the hood until it is able to drop directly downward over the fender 56 of the automobile 42 as shown in FIG. 1. This allows a mechanic to have unobstructed access to the engine compartment from the front of the automobile. In the event that the mechanic needs to access the front corner of the automobile where the electric supply cable 20 is shown dangling in FIG. 1, the cable can be released from the S-hook 54 and placed in another location enabling that access.

Figure 6:
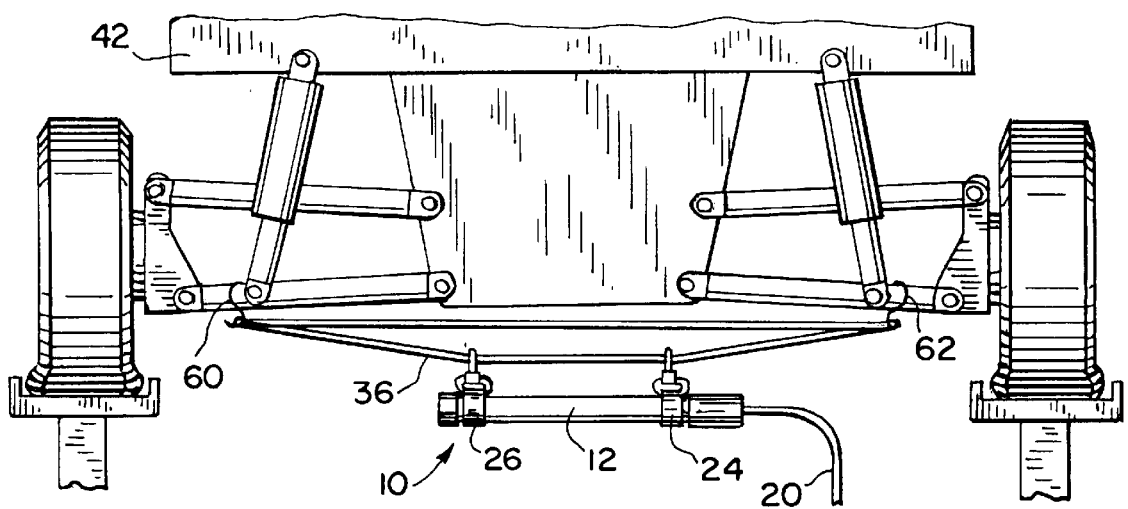
FIG. 6 illustrates the work light attached to the undercarriage of the automobile.

The cord 36 can also be used to attach the work light 10 to other work areas. For example as shown in FIG. 6, the cord can be fastened by a pair of S-hooks 60 and 62 to the suspension for the front wheels on opposite sides of the automobile. The cord 36 is stretched across the undercarriage of the automobile 42 allowing the transparent housing 12 of the work light 10 to dangle from the cord being supported by the fastening assemblies 24 and 26. Because the tube 12 is transparent, light from the bulb 14 therein is emitted in all directions and illuminates the undercarriage of the automobile 48. The transparent tubular housing 12 can be slid along the loop of cord 36 when the user desires to work on only one side of the suspension.

I claim:

1. A portable work light comprising:
   a cord having a first end with a fixed loop formed thereat and a section of the cord passing through the fixed loop to form an adjustable loop of the cord;
   a tube having an aperture within which the cord is received with the tube able to slide along the cord, wherein the tube at a first position squeezes the fixed loop against the section of the cord thereby captivating the cord from moving through the fixed loop, and the tube at a second position along the cord allows the cord to move through the fixed loop; and
   a work light having a housing and a fastener for attaching the housing to the cord.

2. The portable work light as recited in claim 1 further comprising an electric supply cable connected to the work light; and a mechanism by which the electric supply cable is supported from the cord.

3. The portable work light as recited in claim 1 wherein the fastener comprises a strap extending around the housing, and a coupling attached to the strap and through which the cord extends.

4. The portable work light as recited in claim 3 wherein the coupling comprises a loop portion and a hook portion connected together by a swivel mechanism.

5. The portable work light as recited in claim 1 wherein the housing of the work light comprises a transparent tube from which light is emitted; and the fastener comprises a strap extending around the housing, and a coupling attached to the strap and through which the cord extends.

6. The portable work light as recited in claim 5 wherein the coupling comprises a loop portion and a hook portion connected together by a swivel mechanism, and wherein the strap extends through the loop portion and the cord extends through the hook portion.

7. A portable work light comprising:
   a light source having transparent tube from which light is emitted;
   first and second fastening assemblies each having a strap extending around the light source and having a coupling attached to the strap;
   a cord passing through the coupling of each of the first and second fastening assemblies, and having a first end portion with a fixed loop and a second end portion which passes through the fixed loop; and
   a tube having an aperture within which the fixed loop of the cord is received and is able to slide along the fixed loop, wherein the tube has a first position with respect to the fixed loop in which the second end portion is captivated from moving through the fixed loop, and a second position with respect to the fixed loop in which the second end portion is able to move through the fixed loop.

8. The portable work light as recited in claim 7 further comprising an electric supply cable connected to the light source; and a fastener attaching the electric supply cable to the cord.

9. The portable work light as recited in claim 7 wherein the coupling the first and second fastening assemblies each comprises a loop portion and a hook portion connected together by a swivel mechanism, and wherein the strap extends through the loop portion.

10. The portable work light as recited in claim 7 further comprising an electrical supply cable connected to the light source; and an S-hook coupled to the cord and the electric supply cable.

* * * * *